(12) United States Patent
Luker

(10) Patent No.: US 11,524,555 B1
(45) Date of Patent: Dec. 13, 2022

(54) AUTOMATED VEHICLE SUNSCREEN

(71) Applicant: Sally Luker, Cypress, TX (US)

(72) Inventor: Sally Luker, Cypress, TX (US)

( * ) Notice: Subject to any disclaimer, the term of this patent is extended or adjusted under 35 U.S.C. 154(b) by 96 days.

(21) Appl. No.: 17/097,520

(22) Filed: Nov. 13, 2020

Related U.S. Application Data

(60) Provisional application No. 62/935,301, filed on Nov. 14, 2019.

(51) Int. Cl.
*B60J 1/20* (2006.01)

(52) U.S. Cl.
CPC .......... *B60J 1/2016* (2013.01); *B60J 1/2019* (2013.01); *B60J 1/2077* (2013.01)

(58) Field of Classification Search
CPC ...... B60J 1/2013; B60J 1/2016; B60J 1/2019; B60J 1/2077; B60J 3/02
USPC ......... 296/97.4, 97.7, 97.8, 141; 160/370.22, 160/DIG. 3
See application file for complete search history.

(56) References Cited

U.S. PATENT DOCUMENTS

| | | | | |
|---|---|---|---|---|
| 2,077,736 A * | 4/1937 | Bowerman | ................ | B60J 3/02 224/276 |
| 4,762,358 A * | 8/1988 | Levosky | ................ | B60J 1/2063 296/97.7 |
| 4,775,180 A | 10/1988 | Phillips | | |
| 5,064,239 A | 11/1991 | Folcik | | |
| 5,551,744 A * | 9/1996 | Liao | ....................... | B60J 1/2019 296/141 |
| 5,647,421 A * | 7/1997 | Hoffmann | ................. | E06B 9/44 160/241 |
| 5,653,278 A | 8/1997 | Cheng | | |
| 5,751,488 A | 5/1998 | Wade | | |
| 5,845,956 A * | 12/1998 | Yang | ...................... | B60J 1/2077 296/97.8 |
| 5,947,544 A | 9/1999 | Hubeshi | | |
| 6,227,601 B1 | 5/2001 | LaFrance | | |
| 6,318,788 B1 | 11/2001 | Jaurigue | | |
| 6,318,789 B1 * | 11/2001 | Stuart | .................... | B60J 1/2047 296/97.4 |
| 6,572,173 B2 | 6/2003 | Müller | | |
| 7,140,663 B1 | 11/2006 | Thacker | | |
| 8,162,376 B1 | 4/2012 | Grossmith | | |
| 9,834,067 B1 * | 12/2017 | Johnson | ................. | B60J 1/2077 |
| 10,081,227 B1 * | 9/2018 | Mao | ....................... | B60J 1/2041 |
| 2002/0033244 A1 | 3/2002 | Schlecht et al. | | |
| 2007/0223098 A1 * | 9/2007 | Chuang | ...................... | B60J 3/02 359/601 |
| 2010/0060028 A1 * | 3/2010 | Patel | ...................... | B60J 3/0208 296/97.1 |
| 2012/0026618 A1 * | 2/2012 | Chuang | ................... | G02B 5/22 359/889 |

(Continued)

OTHER PUBLICATIONS

Helen, "Choosing the Right Motor for Your Project—DC vs Stepper vs Servo Motors", Wayback Machine, Apr. 1, 2019 (Year: 2019).*

*Primary Examiner* — Jason S Morrow
*Assistant Examiner* — Wenwei Zhuo
(74) *Attorney, Agent, or Firm* — Cramer Patent & Design, PLLC; Aaron R. Cramer

(57) ABSTRACT

An automated vehicle sunscreen comprises a deployable sunscreen secured within the headliner region of an automobile vehicle's interior. The sunscreen may be deployed mechanically by means of a motor in communication with the automobile vehicle's power source. Controls for the sunscreen may be disposed upon the dashboard of the automobile vehicle.

17 Claims, 5 Drawing Sheets

(56) References Cited

U.S. PATENT DOCUMENTS

| | | | |
|---|---|---|---|
| 2017/0145739 A1* | 5/2017 | Choi | E06B 9/42 |
| 2017/0342771 A1* | 11/2017 | Piekny | E06B 9/72 |
| 2020/0016960 A1* | 1/2020 | Greene | B60J 1/2041 |
| 2021/0129634 A1* | 5/2021 | Woldemariam | B60J 1/205 |

* cited by examiner

AUTOMATED VEHICLE SUNSCREEN

RELATED APPLICATIONS

The present invention is a continuation of and claims the benefit of U.S. Provisional Application No. 62/935,301, filed Nov. 14, 2019, the entire disclosures of which are incorporated herein by reference.

FIELD OF THE INVENTION

The present invention relates a sunscreen for an automobile vehicle and more specifically to an automated automobile vehicle sunscreen.

BACKGROUND OF THE INVENTION

Anyone who gets in a closed car that has been parked in the hot sun all day can tell you how hot and intolerable the experience is. The heat is so stifling that it takes your breath away just standing outside of the vehicle. Often, minutes are wasted waiting for the vehicle to cool off enough just to get inside. Once inside, even if the driver is lucky enough to have air conditioning, it is several minutes before the car is cool enough to be tolerable. Even disregarding the discomfort of the occupants, the car interior as well as any contents located within suffers from the heat also. Ultraviolet radiation and heat tend to destroy plastic, fabrics and the like.

A popular tool to combat such heat gain is the popular cardboard shield which is unfolded and secured behind the rear-view mirror. This method however suffers from several disadvantages. First, it is unsightly. Secondly, it is difficult to put up and take down thus causing it to be used infrequently, limiting its effectiveness. Finally, when not in use, is it difficult to store and access, further making it less likely to be used. Accordingly, there exists a need for a means by which the interior of a motor vehicle can be protected from the effects of sun and heat buildup without the inefficiencies associated with conventional automotive window shields. The use of the automated vehicle sunscreen allows car owners to protect the interior of their motor vehicle from sun and heat damage without the clumsiness and inefficiency of conventional car covers.

SUMMARY OF THE INVENTION

The disadvantages of the prior art are overcome by the present invention in providing an automated vehicle sunscreen assembly, having a sunscreen which is adapted to cover a windshield, a rearview mirror, a steering wheel, and a dashboard of a vehicle and a reel housing which contains the sunscreen. The reel housing is attached within a headliner portion of a ceiling of the interior of the vehicle which is adjacent to the windshield. The automated vehicle sunscreen assembly may also have at least one motor which moves the sunscreen up and down in front of the windshield and a generally oval-shaped cut-out which serves as a handle. The generally oval-shaped cut-out is located adjacent to a reinforced edge of the sunscreen while also being centrally located.

The sunscreen may be adapted to cover most or all of the windshield, the rearview mirror, the steering wheel, and the dashboard of the vehicle. The sunscreen may be manually operated. A first side of the sunscreen may be attached within the reel housing. A second side opposite of the first side of the sunscreen may have a reinforced edge which has a weight that enables the sunscreen to remain deployed due to gravity and not curl up. The reinforced edge may have a thickness that is smaller than a slit of the reel housing to prevent the sunscreen from fully being wound therewithin when fully stowed. The sunscreen may have a generally rectangular shape.

The sunscreen may be capable of resting on or covering most or all of a seat in a forward part of an interior compartment of the vehicle and may include one or more colors and patterns to match or complement the vehicles. The reel housing may include the at least one motor at a first end of the reel housing and a bearing at a second end of the reel housing opposite the first end. The at least one motor may be controlled by an activation button. The at least one motor may be a high torque, low revolutions per minute stepper motor. A motor shaft of each of the at least one motor may be directly coupled to a core upon which the sunscreen is wound and imparts a bi-directional rotational travel path to the core through the motor shaft and allows the sunscreen to deploy and retract.

The generally oval-shaped cut-out may allow grasping and deploying of the sunscreen. A set of motor leads may provide electrical power to the motor which is reversed in polarity to account for the bi-directional rotational travel path. The handle resides outside of the reel housing when the sunscreen is fully stowed.

A pulling force on the handle may release the at least one motor and enable manual deployment of the sunscreen. The automated vehicle sunscreen assembly may provide shade and protects an interior portion of the vehicle from heat and radiation emanating from sunshine and passing into the interior portion of the vehicle through the windshield. The automated vehicle sunscreen assembly may be a piece of optional equipment on a new vehicle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
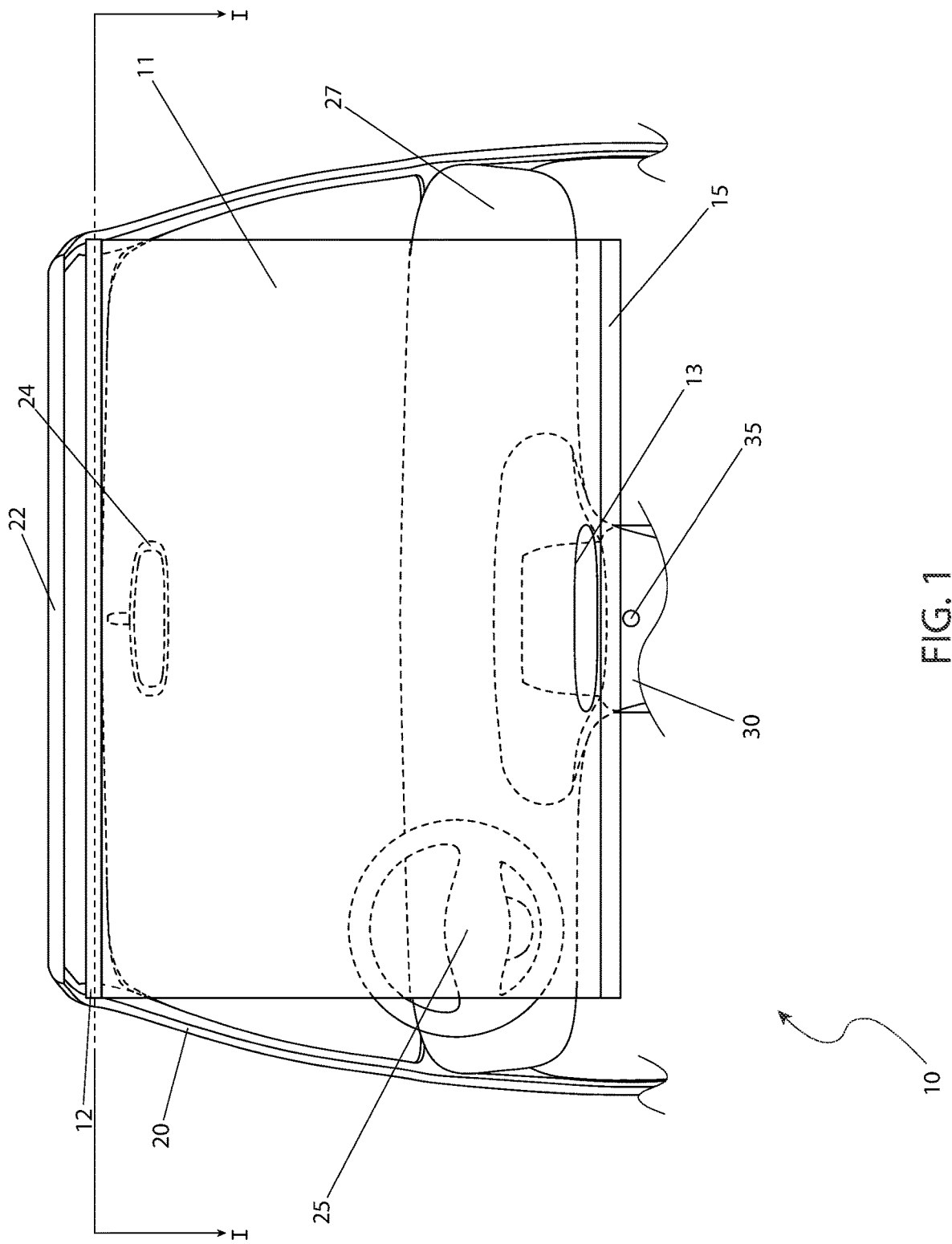
FIG. 1 is a front environmental view of the automated vehicle sunscreen as it is installed within a vehicle and fully deployed, according to the preferred embodiment of the present invention.

DESCRIPTIVE KEY 10 automated vehicle sunscreen assembly
11 sunscreen
12 reel housing
13 handle 15 reinforced edge
20 vehicle
22 headliner
23 windshield
24 rearview mirror
25 steering wheel
27 dashboard
29 seat
30 center console
35 activation button
40 motor
45 bearing
50 motor shaft
55 core
60 bi-directional rotational travel path "r"
65 motor lead
70 slit
75 deployment travel path "d'
80 power source
85 overcurrent device

DESCRIPTION OF THE INVENTION

Figure 2:
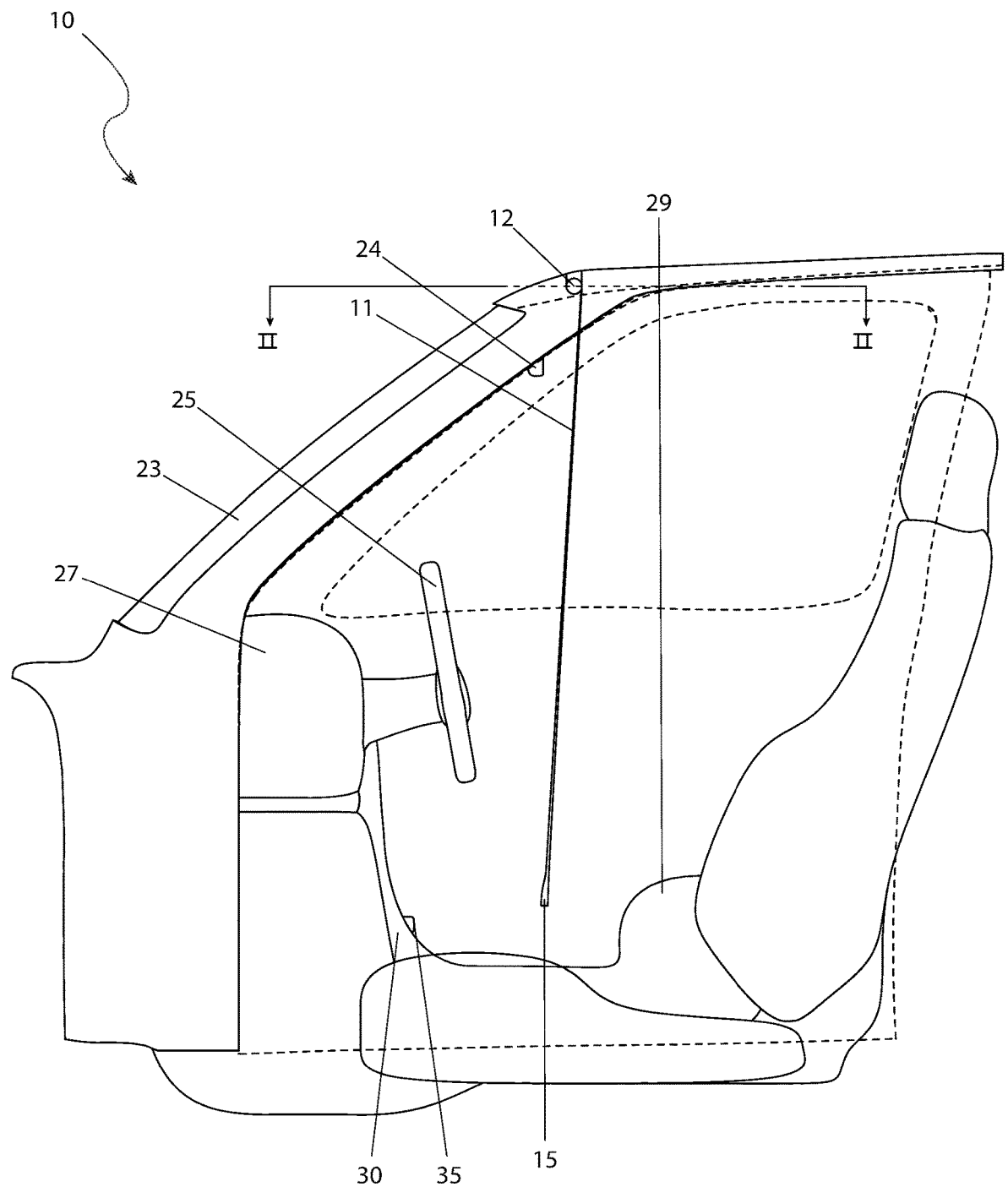
FIG. 2 is a side environmental view of the automated vehicle sunscreen as it is installed within a vehicle and fully deployed, according to the preferred embodiment of the present invention.

The best mode for carrying out the invention is presented in terms of its preferred embodiment, herein depicted within FIGS. 1 and 2. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIGS. 1 and 2, the automated vehicle sunscreen assembly 10 is intended to shade and protect the inside of a vehicle 20 from the heat and radiation emanating from the sun and passing into the interior through the windshield 23. It is fashioned similar to a pull-down window shade that would be used in a home. The assembly 10 is intended to be operated either automatically or manually as desired.

The assembly 10 includes a sunscreen 11 housed within a reel housing 12 that is attached to or concealed within a headliner 22 portion of a ceiling of the interior of the vehicle 10, immediately adjacent the windshield 23. A first side of the sunscreen 11 is attached within the reel housing 12. At least one (1) motor 40 that is capable of forward motion (i.e., downward deployment of the sunscreen 11) and backward motion (i.e., upward stowage of the sunscreen 11) is mounted within the vehicle 10. Actual operation is controlled by an activation button 35, similar to a power window, and preferably sited on the center console 30.

The sunscreen 11 has a width sized to cover most or all of the windshield 23 and a length to cover the rearview mirror 24, steering wheel 25, and dashboard 27 of the vehicle 20 when fully deployed. As such, the sunscreen 11 is generally rectangular. In certain embodiments, the size of the sunscreen 11 is capable of resting on or covering most if not all of the seat 29 in the forward part of the interior compartment of the vehicle 20. The sunscreen 11 is envisioned to be provided in a multitude of colors and patterns to match or complement all vehicles 20. The material of the sunscreen 11 enables it to adequately block the rays of the sun to provide shade to the interior of the vehicle 20. As aforementioned, the first side of the sunscreen 11 is attached within the reel housing 12. An opposing second side of the sunscreen 11 has a reinforced edge 15. This reinforced edge 15 has a weight that enables it to remain deployed due to the pull of gravity and not curl up. Also, the reinforced edge 15 has a thickness that is smaller than the slit 70 of the reel housing 12 to prevent the sunscreen 11 from fully being wound therewithin when fully stowed. A generally oval-shaped cut-out functions as a handle 13 and is preferably located adjacent the reinforced edge 15 of the sunscreen 11 and centrally located thereby, so as to provide a manual means of grasping and deploying the sunscreen 11. As such, the handle 13 resides outside of the reel housing 12 when the sunscreen 11 is fully stowed. A pulling force on the handle 13 releases the motor 40 and enables manual deployment of the sunscreen 11. It is envisioned the assembly 10 would most likely be made available as optional equipment on new vehicles 20.

Figure 3:
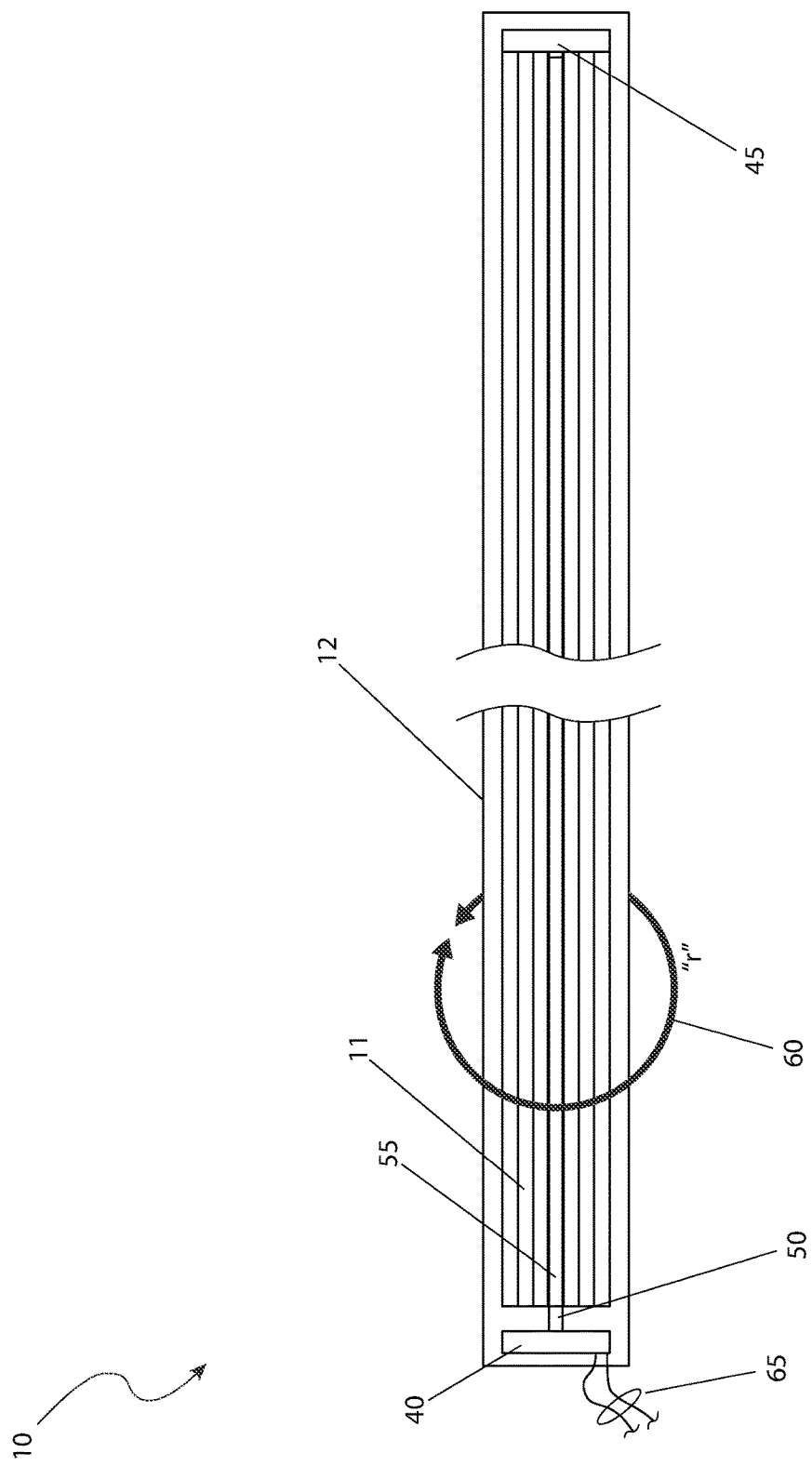
FIG. 3 is a sectional view of the automated vehicle sunscreen assembly, as seen along a Line I-I, as shown in FIG. 1, according to the preferred embodiment of the present invention.

Referring now to FIG. 3, a sectional view of the automated vehicle sunscreen assembly 10, as seen along a Line I-I, as shown in FIG. 1, according to the preferred embodiment of the present invention is depicted. The reel housing 12 is provided with a motor 40 at a first end and a bearing 45 at the opposing second end. The motor 40 is envisioned to be a high torque, low revolutions per minute (RPM) motor such as a stepper motor. However, other types of motors 40 and or gearboxes could be utilized as seen by those familiar in the art. As such, the use of any particular type or style of motor 40 is not intended to be a limiting factor of the present invention. The motor shaft 50 of the motor 40 is directly coupled to a core 55 upon which the sunscreen 11 is wound. The motor 40 imparts a bi-directional rotational travel path "r" 60 to the core 55 through the motor shaft 50 and thus allows the sunscreen 11 to deploy and retract as shown in FIG. 1. A set of motor leads 65 provide electrical power to the motor 40 which can be reversed in polarity to account for the bi-directional rotational travel path "r" 60. Further description of the motor leads 65 and said polarity reversal will be described in greater detail herein below.

Figure 4:
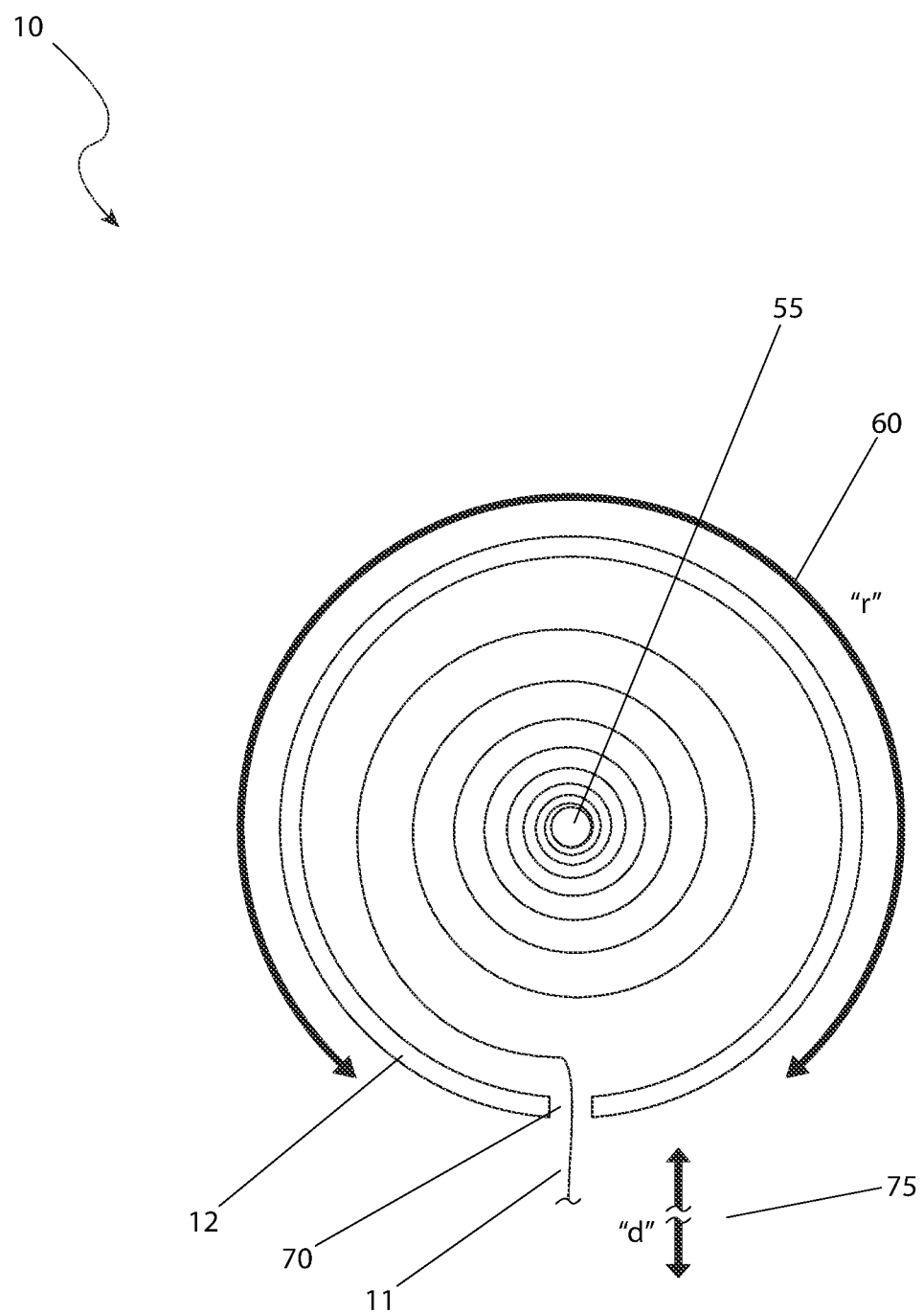
FIG. 4 is a sectional view of the automated vehicle sunscreen assembly, as seen along a Line II-II, as shown in FIG. 2, according to the preferred embodiment of the present invention.

Referring next to FIG. 4, is a sectional view of the automated vehicle sunscreen assembly 10, as seen along a Line II-II, as shown in FIG. 2, according to the preferred embodiment of the present invention is disclosed. The sunscreen 11 is shown coiled in a helical manner around the core 55 and contained within the reel housing 12, in either a clockwise or counter-clockwise manner. The distal portion of the sunscreen 11 with respect to the core 55 is routed through a slit 70 in the bottom of the reel housing 12. Thus, as the sunscreen 11 is deployed or retracted by movement along the bi-directional rotational travel path "r" 60, a corresponding deployment travel path "d" 75 is generated. In its fully retracted position, the sunscreen 11 is not readily visible outside of the reel housing 12, thus making the vehicle 20 (as shown in FIG. 1) suitable for driving. In its fully extended position, as shown in FIGS. 1 and 2, the sunscreen 11 is suitable for providing shade to the interior of the vehicle 20.

Figure 5:
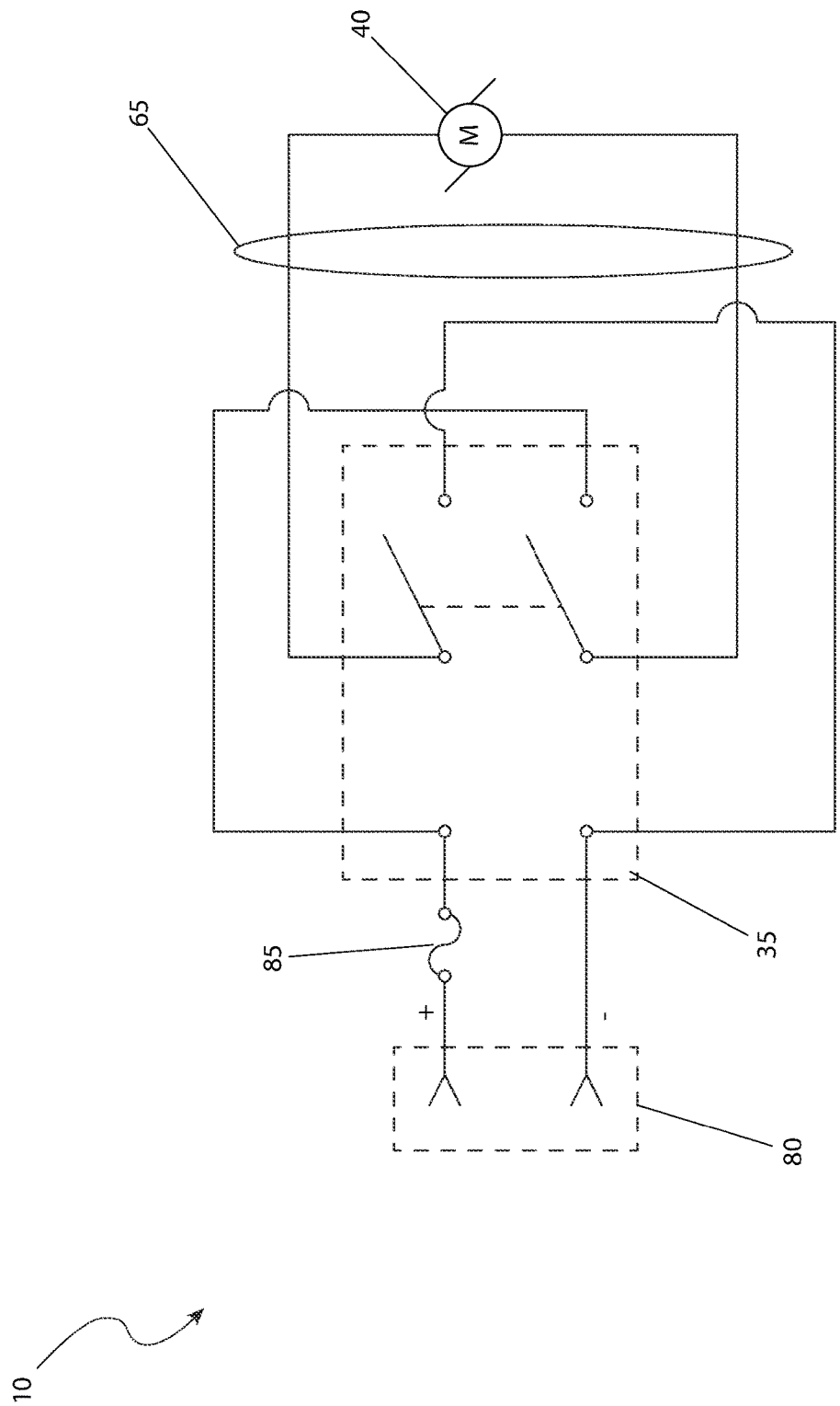
FIG. 5 is an electrical block diagram of the automated vehicle sunscreen assembly, according to the preferred embodiment of the present invention.

Referring finally to FIG. 5, an electrical block diagram of the automated vehicle sunscreen assembly 10, according to the preferred embodiment of the present invention is shown.

A power source 80, envisioned to be provided from the electrical system of the vehicle 20 (as shown in FIG. 1) provides power for the automated vehicle sunscreen assembly 10. The power source 80 is envisioned to provide power at all times without regard to the fact whether the vehicle 20 is operating or not. The power source 80 would be protected by an overcurrent device 85, such as a fuse (as shown) or circuit breaker. Resultant power from the load side of the overcurrent device 85 is routed to the activation button 35, envisioned to be a double-pole, double-throw (DPDT) switch, capable of reversing polarity of its common center connection. The resultant power from the activation button 35 is routed along the motor leads 65 to the motor 40 to provide bi-directional operation as aforementioned described.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. An automated vehicle sunscreen assembly, comprising:
    a sunscreen adapted to cover a windshield, a rearview mirror, a steering wheel, and a dashboard of a vehicle;
    a reel housing containing the sunscreen, the reel housing is attached within a headliner portion of a ceiling of the interior of the vehicle adjacent to the windshield;
    at least one motor moving the sunscreen up and down in front of the windshield; and
    a generally oval-shaped cut-out serving as a handle, the generally oval-shaped cut-out is located adjacent to a reinforced edge of the sunscreen and is centrally located thereon;
    wherein the generally oval-shaped cut-out allows grasping and deploying the sunscreen; and
    wherein a pulling force on the handle releases the at least one motor and enables manual deployment of the sunscreen.

2. The automated vehicle sunscreen assembly, according to claim 1, wherein the sunscreen is adapted to cover most of the windshield, the rearview mirror, the steering wheel, and the dashboard of the vehicle.

3. The automated vehicle sunscreen assembly, according to claim 1, wherein the sunscreen is a pulldown sunscreen.

4. The automated vehicle sunscreen assembly, according to claim 1, wherein a first side of the sunscreen is attached within the reel housing.

5. The automated vehicle sunscreen assembly, according to claim 4, wherein a second side opposite of the first side of the sunscreen has the reinforced edge having a weight that enables the sunscreen to remain deployed due to gravity and not curl up.

6. The automated vehicle sunscreen assembly, according to claim 5, wherein the reinforced edge has a thickness that is greater than a slit of the reel housing.

7. The automated vehicle sunscreen assembly, according to claim 1, wherein the sunscreen has a generally rectangular shape.

8. The automated vehicle sunscreen assembly, according to claim 1, wherein the sunscreen is capable of resting on or covering most or all of a seat in a forward part of an interior compartment of the vehicle.

9. The automated vehicle sunscreen assembly, according to claim 1, wherein the sunscreen includes one or more colors and patterns to match the vehicle.

10. The automated vehicle sunscreen assembly, according to claim 1, wherein the reel housing includes the at least one motor at a first end of the reel housing and a bearing at a second end of the reel housing opposite the first end.

11. The automated vehicle sunscreen assembly, according to claim 1, wherein the at least one motor is controlled by an activation button.

12. The automated vehicle sunscreen assembly, according to claim 1, wherein the at least one motor is a high torque, low revolutions per minute stepper motor.

13. The automated vehicle sunscreen assembly, according to claim 1, wherein a motor shaft of each of the at least one motor is directly coupled to a core upon which the sunscreen is wound and imparts a bi-directional rotational travel path to the core through the motor shaft and allows the sunscreen to deploy and retract.

14. The automated vehicle sunscreen assembly, according to claim 13, wherein a set of motor leads provide electrical power to the motor which is reversed in polarity to account for the bi-directional rotational travel path.

15. The automated vehicle sunscreen assembly, according to claim 1, wherein the handle resides outside of the reel housing when the sunscreen is fully stowed.

16. The automated vehicle sunscreen assembly, according to claim 1, wherein the automated vehicle sunscreen assembly provides shade and protects an interior portion of the vehicle from heat and radiation emanating from sunshine and passing into the interior portion of the vehicle through the windshield.

17. The automated vehicle sunscreen assembly, according to claim 1, wherein the automated vehicle sunscreen assembly is a piece of optional equipment on a new vehicle.

* * * * *